(12) United States Patent
Squires

(10) Patent No.: US 9,636,846 B1
(45) Date of Patent: May 2, 2017

(54) METHOD AND APPARATUS FOR SIDEWARDS FLYING BED

(71) Applicants: Arthur M. Squires Irrevocable Trust, Blacksburg, VA (US); Steven Critchfield, Blacksburg, VA (US)

(72) Inventor: Arthur M. Squires, Blacksburg, VA (US)

(73) Assignee: Arthur M. Squires Irrevocable Trust, Blacksburg, VA (US)

( * ) Notice: Subject to any disclaimer, the term of this patent is extended or adjusted under 35 U.S.C. 154(b) by 934 days.

(21) Appl. No.: 13/731,458

(22) Filed: Dec. 31, 2012

Related U.S. Application Data

(60) Provisional application No. 61/581,301, filed on Dec. 29, 2011, provisional application No. 61/584,357, filed on Jan. 9, 2012.

(51) Int. Cl.
  *B29B 11/04* (2006.01)
  *B01F 11/00* (2006.01)

(52) U.S. Cl.
  CPC .......... *B29B 11/04* (2013.01); *B01F 11/0002* (2013.01)

(58) Field of Classification Search
  CPC .............. B01F 11/0002; B01F 11/0017; B01F 11/0097; B29B 11/04
  (Continued)

(56) References Cited

U.S. PATENT DOCUMENTS 891,788 A * 6/1908 Winans .................. B60S 1/166
366/237

1,467,214 A * 9/1923 White ..................... D06F 37/36
366/219

(Continued)

FOREIGN PATENT DOCUMENTS

FR   1565187 A  *  4/1969  ............ A47J 43/042

OTHER PUBLICATIONS

Arthur M. Squires, Chemical process opportunities for vibrated powders: 3. Provisional design for an experimental sidewards flying bed, Powder Technology, Jun. 6, 2007, pp. 56-62, vol. 175, Issue 2, Department of Chemical Engineering, Virginia Polytechnic Institute and State University, Blacksburg VA 24061-0211, USA.

(Continued)

*Primary Examiner* — Charles Cooley
*Assistant Examiner* — Marc C Howell
(74) *Attorney, Agent, or Firm* — James Creighton Wray; Meera P. Narasimhan

(57) ABSTRACT

Granular matter placed in a vertical cylinder rotated back and forth between limiting angles creates a sidewards flying bed. A spoke is connected at one between a vertical drive shaft rotating the cylinder and a first hinge. A drive rod is connected between the first hinge and a second hinge on a rotating flywheel. Rotation of the flywheel causes the drive shaft to rotate through an angle varying back and forth between limiting angles. The cylinder's speed of rotation varies. During most of the time centrifugal forces greater than gravity act upon the granular material, causing the material to form a layer on the inner wall of the cylinder. In at least a portion of the recurring time intervals the acceleration and deceleration produce tangential forces greater than the centrifugal forces acting upon the layer, causing the granular material to fly sidewards in a direction tangential to the cylinder's circumference.

20 Claims, 5 Drawing Sheets

(58) Field of Classification Search
USPC .................................................. 366/219, 237
See application file for complete search history.

(56) References Cited

U.S. PATENT DOCUMENTS

| | | | |
|---|---|---|---|
| 1,681,404 A * | 8/1928 | Hardman | D06F 37/30 366/237 |
| 1,764,476 A * | 6/1930 | Smith | D06F 21/06 366/237 |
| 3,228,524 A | 1/1966 | Richards | |
| 3,268,264 A | 8/1966 | Squires | |
| 3,296,775 A | 1/1967 | Squires | |
| 3,541,762 A | 11/1970 | Ramaswami | |
| 3,719,193 A | 3/1973 | Doyle | |
| 3,770,388 A | 11/1973 | Zenz | |
| 3,800,508 A | 4/1974 | Zenz | |
| 3,850,288 A | 11/1974 | Musschoot | |
| 3,912,466 A | 10/1975 | Zenz | |
| 3,921,590 A | 11/1975 | Mitchell | |
| 3,926,587 A | 12/1975 | Squires | |
| 3,926,593 A | 12/1975 | Squires | |
| 3,928,532 A | 12/1975 | Squires | |
| 3,957,953 A | 5/1976 | Squires | |
| 3,981,355 A | 9/1976 | Squires | |
| 3,982,326 A | 9/1976 | Squires | |
| 3,987,148 A | 10/1976 | Squires | |
| 4,000,066 A | 12/1976 | Squires | |
| 4,004,350 A | 1/1977 | Squires | |
| 4,004,897 A | 1/1977 | Squires | |
| 4,006,533 A | 2/1977 | Squires | |
| 4,017,278 A | 4/1977 | Reese | |
| 4,036,598 A | 7/1977 | Soldate | |
| 4,145,280 A | 3/1979 | Middelbeek | |
| 4,157,959 A | 6/1979 | Wen | |
| 4,258,779 A | 3/1981 | Musschoot | |
| 4,299,598 A | 11/1981 | Dutkiewicz | |
| 4,308,036 A | 12/1981 | Zahedi | |
| 4,349,367 A | 9/1982 | Krumwiede | |
| 4,353,722 A | 10/1982 | Berz | |
| 4,354,862 A | 10/1982 | Sgaslik | |
| 4,360,364 A | 11/1982 | Kohl | |
| 4,473,033 A | 9/1984 | Strohmeyer | |
| 4,537,571 A | 8/1985 | Buxel | |
| 4,548,623 A | 10/1985 | Naske | |
| 4,763,570 A * | 8/1988 | Bellanca | A47J 27/14 366/144 |
| 4,784,216 A | 11/1988 | Bracegirdle | |
| 4,880,608 A | 11/1989 | Stelman | |
| 5,048,568 A | 9/1991 | Moody | |
| 5,165,900 A | 11/1992 | Miksitz | |
| 5,401,285 A | 3/1995 | Gillingham | |
| 5,415,684 A | 5/1995 | Anderson | |
| 5,527,514 A | 6/1996 | Watanabe | |
| 5,676,201 A | 10/1997 | Klaren | |
| 6,302,931 B1 | 10/2001 | Min | |
| 6,309,447 B1 | 10/2001 | Felix | |
| 6,605,139 B2 | 8/2003 | Felix | |
| 6,783,326 B2 | 8/2004 | Weitkamp | |
| 6,783,572 B1 | 8/2004 | Squires | |
| 7,309,379 B2 | 12/2007 | Dai et al. | |
| 7,815,717 B1 | 10/2010 | Squires | |
| 8,377,176 B1 | 2/2013 | Squires | |
| 2004/0226450 A1 | 11/2004 | Dai | |
| 2005/0106279 A1 | 5/2005 | Yerian | |
| 2011/0113736 A1 | 5/2011 | Raether | |

OTHER PUBLICATIONS

Squires et al.; "Fluid Beds: At Last, Challenging Two Entrenched Practices"; Science, vol. 230, No. 4732 (Dec. 20, 1985); pp. 1329-1337.

Thomas et al.; "Identifying States in Shallow Vibrated Beds"; Powder Technology, vol. 57 (1989); pp. 267-280.

Thomas et al.; "Some Behaviors of Shallow Vibrated Beds Across a Wide Range in Particle Size and Their Implications for Powder Classification"; Powder Technology, vol. 111, (2000); pp. 34-49.

Yang et al.; "GCrandular-Bed Filtration Assisted by Filter-Cake Formation 5. Treating a Liquid in a Panel Bed with Pulseback Renewal of Liquid-Entry Granular-Bed Faces"; Powder Technology, 2005, 155, pp. 134-138, Elsevier.

Radosz et al.; "Flue-Gas Carbon Capture on Carbonaceous Sorbents: Toward a Low-Cost Multifunctional Carbon Filter for "Green" Energy Producers"; Ind. Eng. Chem. Res., (2008), vol. 47, pp. 3783-3794.

Squires, A.M.; "Granular-Bed Filtration Assisted by Filter-Cake Formation: 4. Advanced Designs for Panel-Bed Filtration and Gas Treating"; Powder Technology, 155 (2005); Elsevier BM.; pp. 74-84.

* cited by examiner

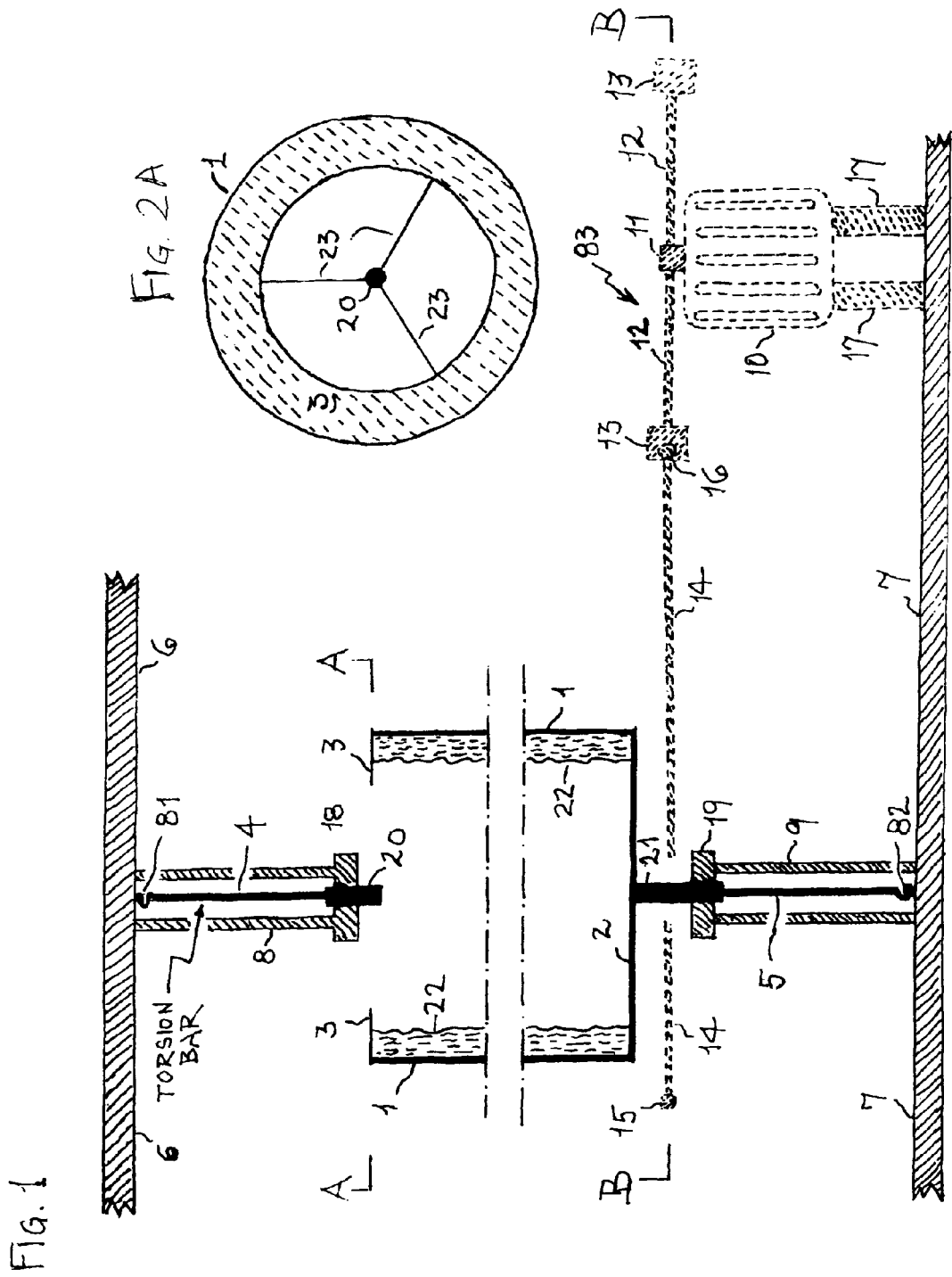

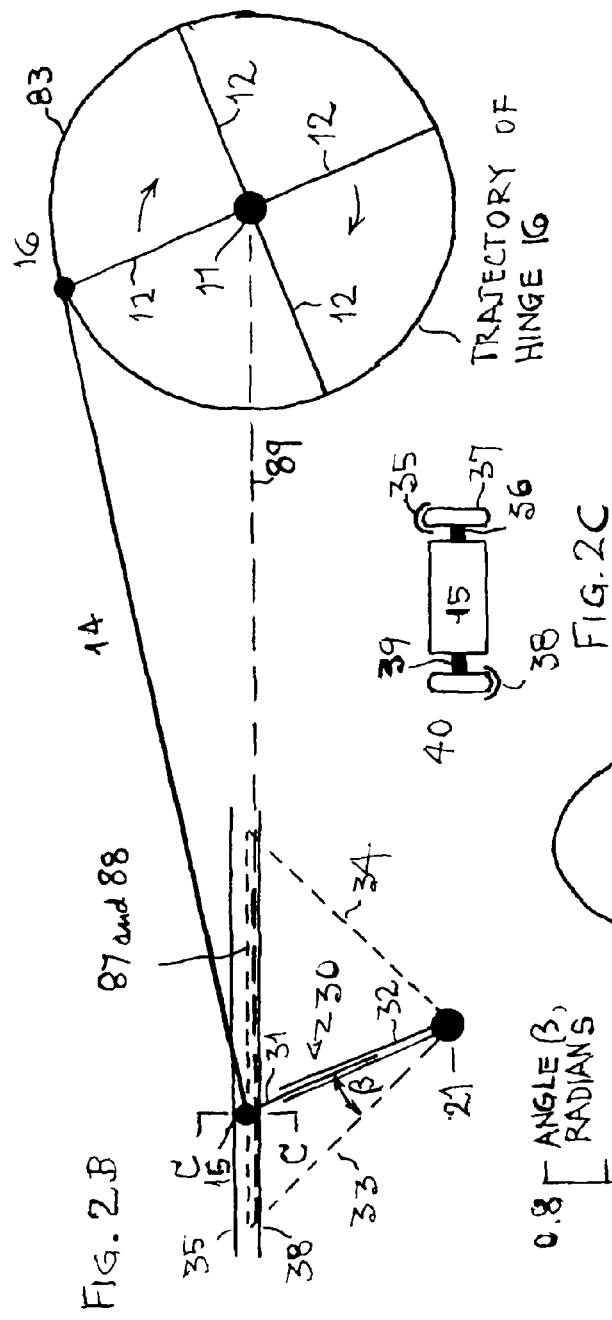
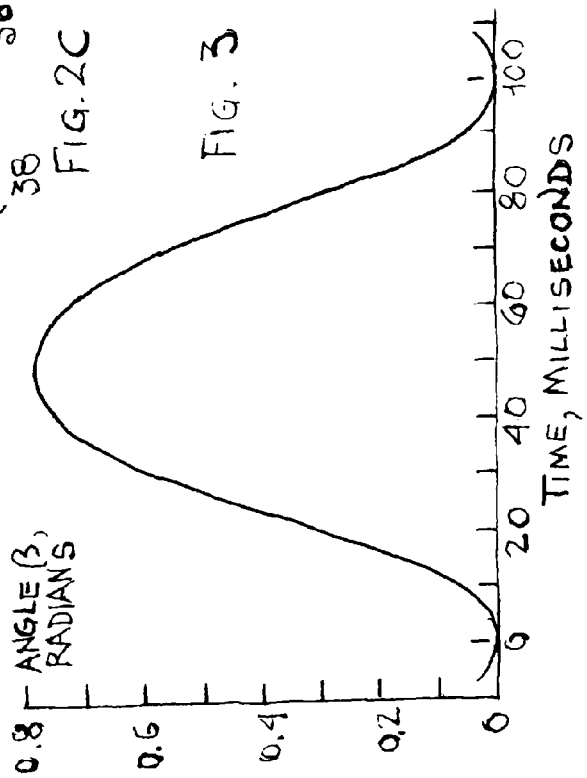

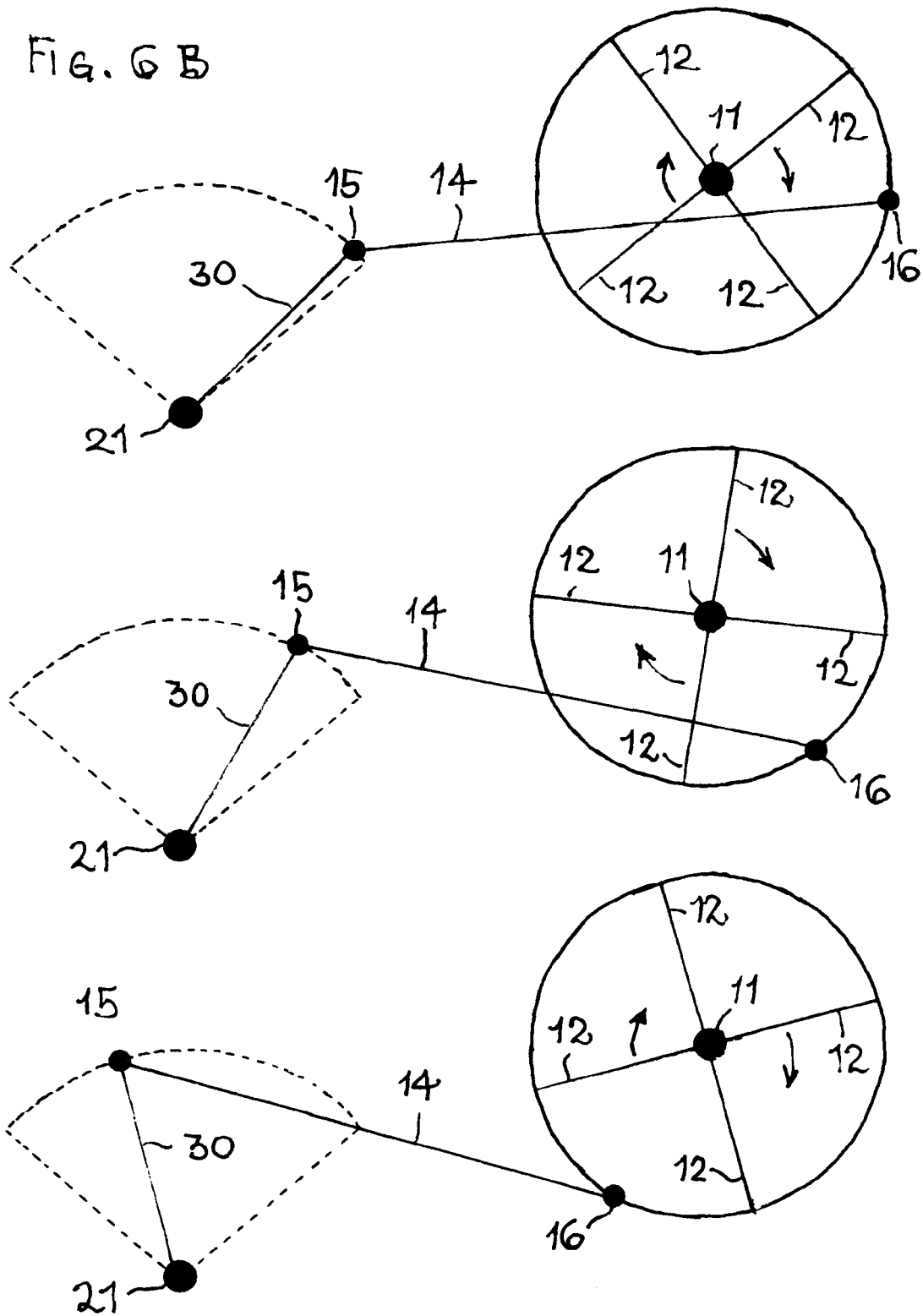

METHOD AND APPARATUS FOR SIDEWARDS FLYING BED

BACKGROUND OF THE INVENTION

This application claims the benefit of U.S. Provisional Application No. 61/581,301 filed Dec. 29, 2011 and U.S. Provisional Application No. 61/584,357 filed Jan. 9, 2012, which are hereby incorporated by reference in their entirety as if fully set forth herein.

FIELDS OF THE INVENTION

The invention relates to processing a solid in granular form, including a granular solid especially heterogeneous in particle size, with particles ranging from small to large; to contacting a granular solid with a gas; to heating or cooling a granular solid; to drying granular solids (especially ones that are delicate physically); to heat-treating small metal parts; to exchanging heat between a granular solid and a gas; to condensing steam through heat exchange with air; and to processing granular matter in a condition of low or substantially zero natural gravity, such as on the surface of the moon or in outer space.

BACKGROUND OF THE INVENTION

An article in *Powder Technology* (Arthur M. Squires, vol. 175, pp. 56-62, entitled "Chemical process opportunities for vibrated powders: 3. Provisional design for an experimental sidewards flying bed") provides an introduction to the sidewards flying bed (SFB). The article describes a number of process applications of the SFB (as summarized in the foregoing section entitled FIELDS OF THE INVENTION). The article in its entirety is incorporated herein by reference.

I have been surprised to discover an improved method and apparatus for creating an SFB, far simpler mechanically than that described in the referenced article.

SUMMARY OF THE INVENTION

In the invention, a relatively shallow bed of a granular solid is held by centrifugal force against the inner wall of a rotating cylinder. The speed of rotation is varied, causing the centrifugal force to vary as well, yet centrifugal forces, for a large part of the time, exceed ambient gravity. The speed variation also creates tangential forces that act upon the powder is a direction generally perpendicular to the artificial gravity of the varying centrifugal force. It is arranged that there are significant time intervals during which the tangential force is greater than the centrifugal force. In a portion of such time intervals, the granular solid "flies sidewards," becoming a "sidewards flying bed." The solid moves in the direction of the tangential force; that is to say, it moves generally circumferentially in relation to the cylinder's axis.

An object of the instant invention is to provide means for processing a solid in granular form, including a solid comprising especially heterogeneous particle sizes, ranging from small to large.

Another object is to provide means for contacting a granular solid with a gas.

Another object is to provide means for heating or cooling a granular solid.

Another object is to provide means for treating a granular solid that includes lumps that are several centimeters in size by heating it to a desired elevated temperature.

Another object is to provide a process for producing foundry or blast-furnace coke.

Another object is to provide a process for producing a lump-form fuel that burns smokelessly in an open fire.

Another object is to provide means for exchanging heat between a granular solid and a gas.

Another object is to condense steam through heat exchange with air.

Another object is to provide a means for processing granular matter in a condition of low or substantially zero natural gravity, such as on the surface of the moon or in outer space.

The instant invention relates to an improved method for establishing a sidewards flying bed (SFB). Granular matter is introduced into a vertical cylinder fitted with a drive shaft for causing the cylinder to rotate. An inner end of a drive spoke is fitted to the drive shaft, and the drive spoke's outer end is fitted via a first hinge to a first end of a drive rod. The second and opposite end of the drive rod is fitted via a second hinge to the periphery of a rotating flywheel, causing the drive shaft to rotate back and forth between first and second limiting angles. The drive shaft's rotation causes the first hinge to move in a trajectory in a horizontal plane, this trajectory being nearby the chord of an arc of a circle centered on the drive shaft and passing through the first hinge when situated at the first and second limiting angles. The hub of the rotating flywheel is situated on a substantially horizontal line passing nearby the first hinge's trajectory. The cylinder's speed of rotation varies, the speed during most of the time causing centrifugal forces greater than ambient gravity to act upon the granular material, thereby causing the material to form a layer next to the inner wall of the cylinder. The acceleration and deceleration of the varying speed produces recurring time intervals during which acting upon the layer are tangential forces greater than the centrifugal forces that obtain during the intervals, thereby causing the granular material in at least a portion of the recurring time intervals to fly sidewards in a direction tangential to the cylinder's circumference.

The instant invention also relates to improved apparatus for creating an SFB. There is a vertical cylinder, means for introducing granular material into the cylinder, a drive shaft for causing the cylinder to rotate, a drive rod, a spoke having an inner end fitted to the drive shaft, a first hinge fitting the drive spoke's outer end to an end of the drive rod, a rotating flywheel, and a second hinge fitting the drive rod's opposite end to the periphery of the flywheel. The flywheel's rotation causes the drive shaft to rotate through an angle varying back and forth between first and second limiting angles. The drive shaft's rotation causes the first hinge to move in a trajectory in a horizontal plane, this trajectory being nearby the chord of an arc of a circle centered on the drive shaft and passing through the first hinge when situated at the first and second limiting angles. The hub of the rotating flywheel is situated on a substantially horizontal line passing nearby the first hinge's trajectory. The cylinder's speed of rotation varies, the speed during most of the time causing centrifugal forces greater than ambient gravity to act upon the granular material, thereby causing the material to form a layer next to the inner wall of the cylinder. The acceleration and deceleration of the varying speed produces recurring time intervals during which acting upon the layer are tangential forces greater than the centrifugal forces that obtain during the intervals, thereby causing the granular material in at least a portion of the recurring time intervals to fly sidewards in a direction tangential to the cylinder's circumference.

BRIEF DESCRIPTION OF THE DRAWINGS

The invention will be more particularly described in conjunction with the following drawings wherein:

FIG. 1 is a schematic vertical cross-sectional drawing of an illustrative design of a sidewards flying bed (SFB), including an introduction to angle β through which the SFB moves back and forth.

FIG. 2A is a schematic drawing of a view taken along line A-A in FIG. 1.

FIG. 2B is a schematic drawing of a view taken along line B-B in FIG. 1.

FIG. 2C is a schematic drawing of a view taken along line C-C in FIG. 2B.

FIG. 3 shows the variation of angle β in one cycle of the motion of the SFB.

FIGS. 6A and 6B present a simpler design than that of FIG. 1.

DETAILED DESCRIPTION OF THE PREFERRED EMBODIMENTS

Figure 4:
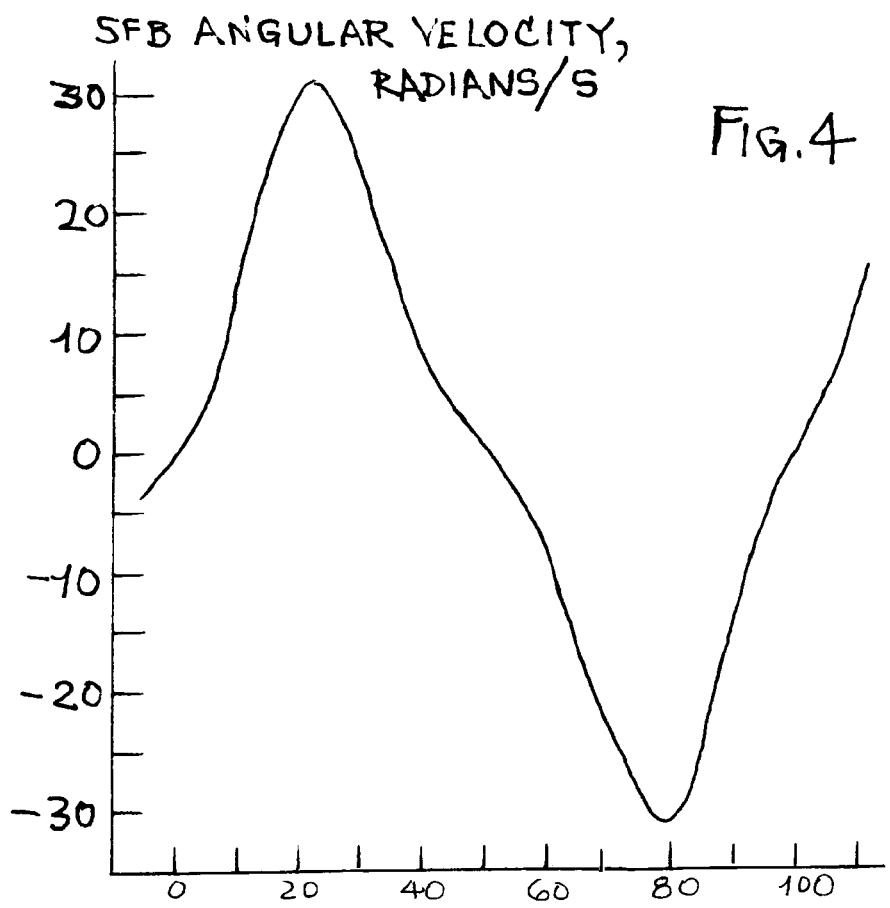
FIG. 4 gives the SFB's angular velocity versus time.

In the several figures, like reference numerals refer to like parts having like functions. The several figures discuss embodiments of the instant invention in which the ambient gravity is earth's gravity.

FIG. 1, a vertical cross-section, and FIG. 2A a view along line A-A in FIG. 1, FIG. 2B, a view along line B-B in FIG. 1, and FIG. 2C a view along line C-C in FIG. 2B show sketch of an improved apparatus for creating a sidewards flying bed (SFB). The improved mechanical arrangement is far simpler than the arrangement described in the cited *Powder Technology* article.

In FIG. 1, vertical cylinder 1 has at its bottom a closure 2 and at its top a partial closure 3. Cylinder 1 is suspended vertically by torsion bars 4 and 5 between sturdy upper and lower floors 6 and 7. Pigtails 81 and 82, respectively, terminate torsion bars 4 and 5, and are able to compensate for their tendency to shorten when twisted. Cylindrical housings 8 and 9 enclose torsion bars 4 and 5 respectively. Ends of pigtails 81 and 82 at floors 6 and 7 are fixed, while the opposite ends of torsion bars 4 and 5 are connected to bearing shaft members 20 and 21, capable of rotation and held within bearing sleeves 18 and 19. Shaft members 20 and 21 are situated at the central axis of cylinder 1. Shaft member 21 is connected to closure 2 of cylinder 1. FIG. 2A shows rods 23 connecting rotating bearing shaft member 20 (via partial closure 3) with cylinder 1.

Pillars 17, rising from floor 7, support electric motor 10. (Motor 10 and other elements of FIG. 1 are sketched in dashed lines; these elements occupy a vertical plane generally parallel to and behind the FIG. 1 cross-section.) Motor 10 turns axle 11, which is connected via spokes 12 to heavy, circular member 13. Axle 11, spokes 12, and member 13 comprise flywheel 83. Hinge 16 occupies a position on the periphery of element 13. Drive bar 14 connects hinge 16 with hinge 15.

FIG. 2B shows horizontal view B-B of FIG. 1. Bar arrangement 30 connects hinge 15 to bearing shaft member 21. Clockwise rotation of flywheel 83 alters the position of hinge 15. As shown in FIG. 2C, the position of hinge 15 is constrained to follow straight-line trajectory 87: gutter or channel 35 provides a path for wheel 37, connected by axle 36 to hinge 15; the gutter prevents hinge 15 from moving upward; and a second gutter or channel 38 provides a path for wheel 40, connected by axle 39 to hinge 15; the second gutter prevents hinge 15 from moving downward. Straight-line trajectory 87 is nearby chord 88 of an arc of the circle of radius equal to maximum extension of bar arrangement 30 and centered on axle 21 (the circle arc is not shown in FIG. 2B). Bar arrangement 30 comprises a rod 31 capable of motion either toward hinge 15 or toward shaft member 21 within cylinder or tube 32; this arrangement enables bar arrangement 30 to alter its length as required by the straight-line motion of hinge 15. Motion of hinge 15 causes cylinder 1 to rotate back and forth on its axis between the limits 33 and 34, seen in FIG. 2B.

Axle 11 of flywheel 83 is located on a substantially horizontal line 89 passing nearby chord 88. Line 89 commences at the location of hinge 15 when the hinge is at its greatest distance from flywheel 83. In the drawing of FIG. 2, straight-line trajectory 87 in fact follows chord 88, and line 89 is an extension of the trajectory.

If design parameters for the apparatus of FIGS. 1 and 2A, 2B, 2C are suitable, and if a granular material is introduced into cylinder 1, a centrifugal force generated upon the granular material is considerably greater than earth's gravity during a significant portion of the motion of cylinder 1. If so, the centrifugal force, although it varies, will press the granular material placed within cylinder 1 against the cylinder's inner wall, causing the material to form a layer 22 next to the wall. As the cylinder's speed of rotation varies, its acceleration or deceleration causes a varying tangential force to act upon layer 22. If, again, design parameters are suitable, this tangential force is greater than the centrifugal force acting on layer 22 during time intervals amounting to a significant portion of the rotary motion of cylinder 1. At some moment during such a time interval, granular material in layer 22 takes flight "sidewards"—that is to say, in a direction tangential to the circumference of cylinder 1, a direction generally perpendicular to the centrifugal force pressing the layer against the inner wall of cylinder 1. In other words, with suitable parameters for design of the apparatus of FIGS. 1 and 2A, 2B, 2C, layer 22 becomes an SFB.

"Suitable" design parameters are, for example, but not limited to:
  Motor 10 speed=600 rotations per minute (RPM)
  Radius of cylinder 1=15 cm
  Length of bar 14=58.6 cm
  Maximum extension of bar arrangement 30 (maximum distance between center of axle 21 and hinge 15)=17.2 cm
  Distance of horizontal travel of hinge 15=28.6 cm
  Radius of flywheel 83 (distance between hinge 16 and center of axle 11)=14.3 cm
  Swing of angle β: between 0° and 90° (0 and π/4 radians)

For a design with these parameters, FIG. 3 shows how angle β (in radians) varies during one rotation of flywheel 83.

FIG. 4 gives the angular velocity of the SFB (in radians per second).

Figure 5:
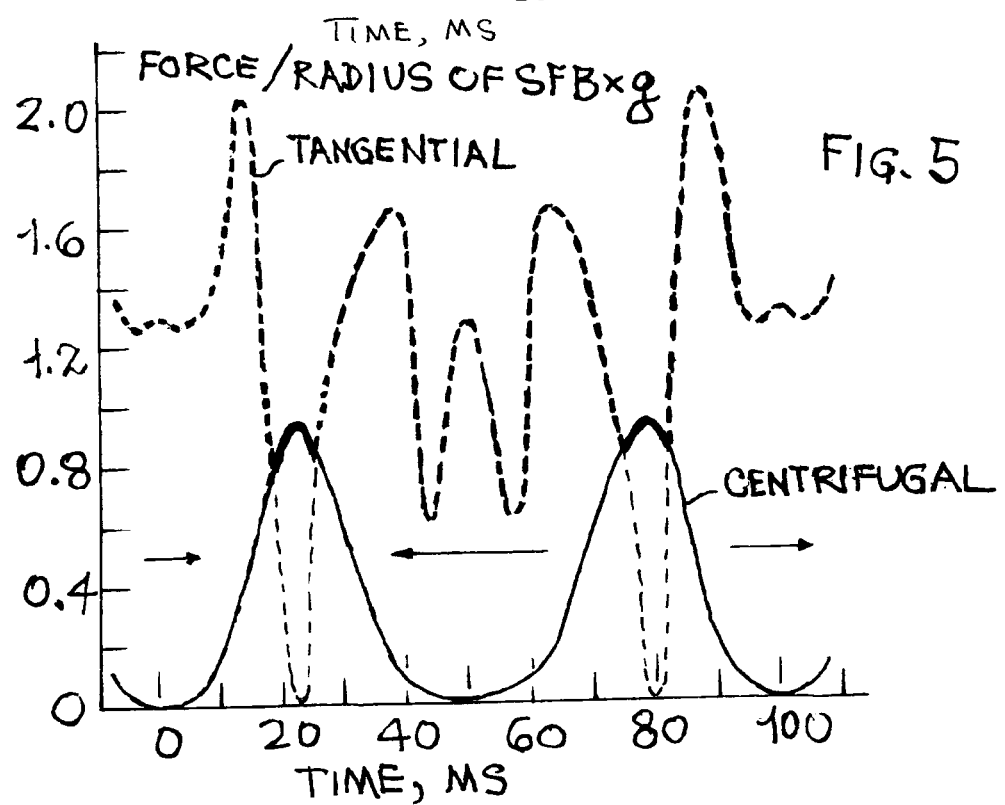
FIG. 5 plots the two forces acting upon the SFB, centrifugal and tangential.

FIG. 5 shows the two forces acting upon granular bed 22, the forces being expressed as [(angular velocity)$^2$/(radius of cylinder 1)×g, where g=the acceleration of earth's gravity, 980 cm$^2$/s; angular velocity is in radians; and radius of cylinder is in cm. (Note that the curves of FIG. 5 apply to any SFB for which the dimensions set down above are changed proportionally.)

Notice also in FIG. 5 that the tangential force acting upon bed 22 is greater than the centrifugal force acting thereupon during a major portion of the 100-millisecond time of flywheel 83's one rotation. Arrows show direction of motion of the SFB: rightward pointing arrows signify clockwise motion; the leftward-pointing arrow signifies counterclockwise motion. For the example of the new mechanical arrangement described herein, the fraction of time during which tangential force dominates the centrifugal force is larger than for an arrangement described in the aforementioned *Powder Technology* article.

Figure 6A:
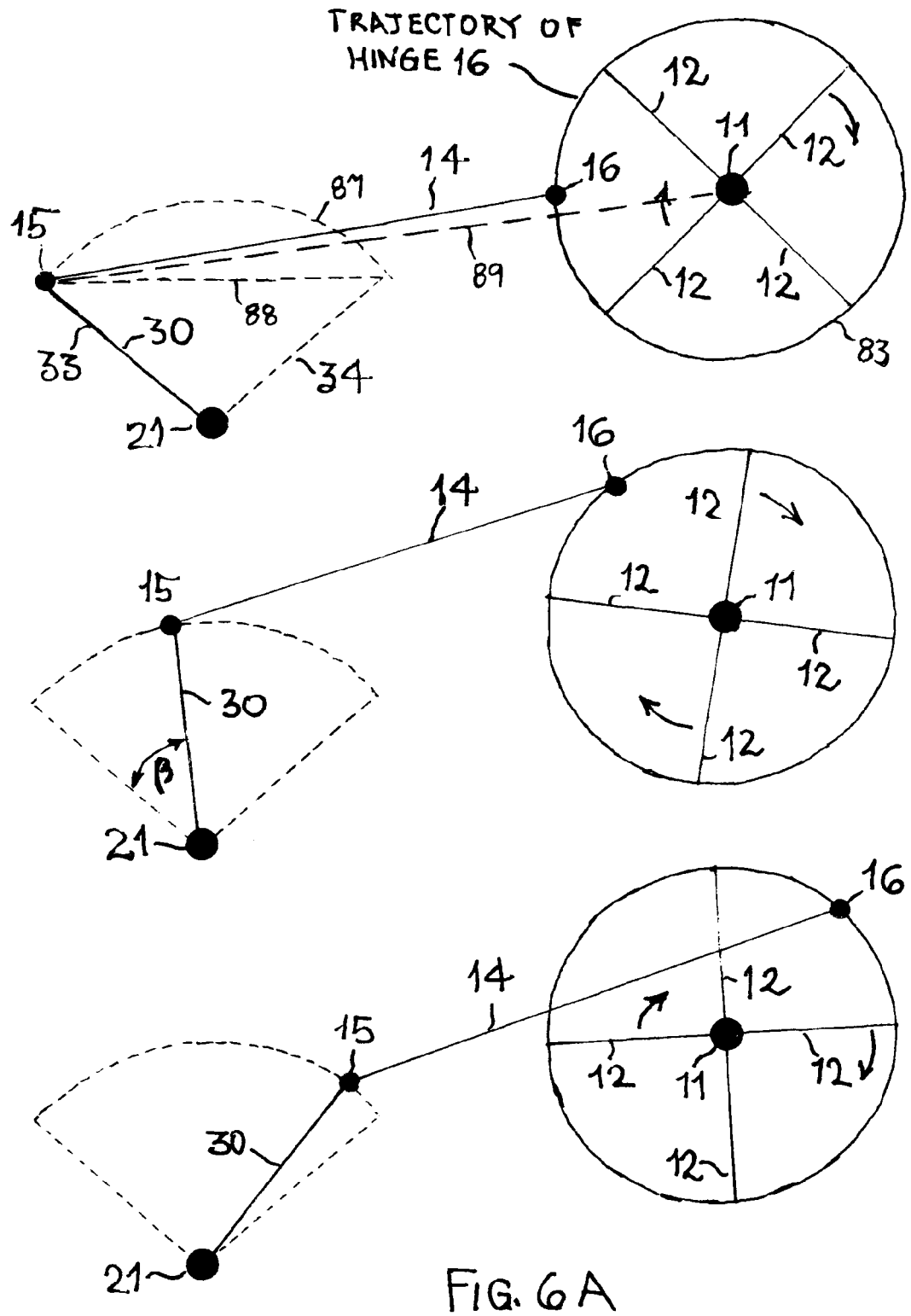

The sketches in FIGS. 6A and 6B disclose a simpler mechanical arrangement for driving cylinder 1 than that seen in FIGS. 1 and 2. FIGS. 6A and 6B are, generally, horizontal sections like Section B-B in FIGS. 1 and 2A, 2B 2C at various times during flywheel 83's rotation. The fixed length of bar 30 in the simpler arrangement requires hinge 15 to travel back and forth along trajectory 87, an arc of a circle of a diameter equal to the length of bar 30. A preliminary study of variation of angle β over time suggests the simpler arrangement can produce a satisfactory SFB.

In FIGS. 6A and 6B, axle 11 of flywheel 83 is situated on substantially horizontal line 89 passing nearby chord 88 of the circular arc of hinge 15's trajectory 87. Line 89 commences at the location of hinge 15 when the hinge is at its greatest distance from flywheel 83.

Note that in FIGS. 1, 2A, 2B, 2C, 6A, and 6B, flywheel 83 is horizontal. An option would be a design in which flywheel 83 is vertical, or in which flywheel 83 occupies an angle between horizontal and vertical. It is probable that a best arrangement can be ascertained only by experiment, this best providing the greatest degree of mixing of the granular material of the SFB.

While the invention has been described with reference to specific embodiments, modifications and variations of the invention may be constructed without departing from the scope of the invention, which is defined in the following claims.

I claim:

1. An improved method for creating a sidewards flying bed comprising:
   introducing granular material into a vertical cylinder fitted with a drive shaft;
   connecting first and second opposite torsion bars to the vertical cylinder and to opposite floors and suspending the vertical cylinder between the opposite floors,
   fitting an inner end of a drive spoke to said drive shaft and fitting the outer end of said drive spoke via a first hinge to a first end of a drive rod,
   fitting the second and opposite end of said drive rod via a second hinge to the periphery of a rotating flywheel, the rotation of said flywheel causing said drive shaft to rotate through an angle varying back and forth between first and second limiting angles, said rotation of said drive shaft causing said first hinge to move in a trajectory in a horizontal plane, said trajectory being nearby the chord of an arc of a circle centered on said drive shaft and passing through said first hinge when situated at said first and second limiting angles, and
   situating the hub of said rotating flywheel on a substantially horizontal line passing nearby said trajectory, said rotation causing said cylinder to rotate back and forth between said limiting angles at varying speed, said speed during most of the time causing centrifugal forces greater than ambient gravity to act upon said granular material, thereby causing said material to form a layer next to the inner wall of said cylinder, the acceleration and deceleration of said varying speed producing recurring time intervals during which acting upon the said layer are tangential forces greater than the said centrifugal forces that obtain during said intervals, thereby causing said granular material in at least a portion of said recurring time intervals to fly sidewards in a direction tangential to said cylinder's circumference.

2. The method of claim 1, wherein said trajectory of said first hinge follows said chord.

3. The method of claim 1, wherein said trajectory of said first hinge follows said arc of said circle.

4. The method of claim 1, wherein the drive spoke further comprises a first link connected to the drive shaft and a second link axially slidable with the first link and connected to the first hinge.

5. The method of claim 1, further comprising a closed bottom on the cylinder, and a partially closed top on the cylinder.

6. Improved apparatus for creating a sidewards flying bed comprising:
   a vertical cylinder,
   granular material in said cylinder,
   first and second opposite torsion bars connected to said cylinder and to opposite floors for suspending the cylinder between the opposite floors,
   a drive shaft for causing said cylinder to rotate,
   a drive rod,
   a drive spoke having an inner end fitted to said drive shaft and an outer end fitted via a first hinge to a first end of said drive rod,
   a rotating flywheel and a second hinge fitting a second end of said drive rod to said flywheel,
   a variable angle formed by rotation of said flywheel causing said drive shaft to rotate through the angle varying back and forth between first and second limiting angles,
   a trajectory formed by said rotation of said drive shaft causing said first hinge to move in a horizontal plane, said trajectory being nearby the chord of an arc of a circle centered on said drive shaft and passing through said first hinge when situated at said first and second limiting angles, and
   the hub of said rotating flywheel being situated on a substantially horizontal line passing nearby said trajectory,
   said cylinder being rotatable at varying speed by said rotation wherein said cylinder rotates back and forth between said limiting angles at varying speed, said speed during most of the time causing centrifugal forces greater than ambient gravity to act upon said granular material, and
   a layer of said granular material formed by said rotation next to an inner wall of said cylinder, the acceleration and deceleration of said varying speed producing recurring time intervals during which acting upon the said layer are tangential forces greater than the said centrifugal forces that obtain during said intervals, thereby causing said granular material in at least a portion of said recurring time intervals to fly sidewards in a direction tangential to said cylinder's circumference.

7. The apparatus of claim 6, wherein said trajectory of said first hinge follows said chord.

8. The apparatus of claim 6, wherein said trajectory of said first hinge follows said arc of said circle.

9. The apparatus of claim 6, wherein the drive spoke further comprises a first link connected to the drive shaft and a second link axially slidable with the first link and connected to the first hinge.

10. The apparatus of claim 6, further comprising a closed bottom on the cylinder, and a partially closed top on the cylinder.

11. Apparatus comprising:
apparatus for creating a sideways flying bed, further comprising:
a drive shaft,
a cylinder axially connected to the drive shaft,
first and second opposite torsion bars connected to said cylinder and to opposite floors for suspending the cylinder between the opposite floors,
a first link connected to the drive shaft for turning the drive shaft,
a second link slidably connected to the first link,
a first hinge connected to the second link,
a drive rod having a first end connected to the first hinge and having a second end,
a second hinge connected to the second end of the drive rod,
a flywheel connected to the second hinge, and
a motor having a shaft connected to the flywheel for rotating the flywheel.

12. The apparatus of claim 11, further comprising a guide, and wherein the first hinge is confined to reciprocal movement in the guide.

13. The apparatus of claim 12, wherein the guide further comprises spaced apart first and second channels and the first hinge further comprises a body and opposite first and second wheels at opposite ends of the body, wherein the wheels move within the channels.

14. The apparatus of claim 12, wherein the first and second links further comprise a rod and a tube receiving the rod for respective reciprocal movement of the rod and the tube.

15. The apparatus of claim 11, wherein the flywheel further comprises a relatively light central portion and a relatively heavy circular outer portion.

16. The apparatus of claim 11, further comprising a layer of granular material in the cylinder, and wherein speed of the motor and of the flywheel and angular back and forth speed of the cylinder is sufficient to vary effect of gravitational and centrifugal forces and tangential forces of angular acceleration and deceleration on the granular material periodically greater than the centrifugal forces to cause a sidewards flying bed of the granular material from the layer.

17. The apparatus of claim 11, further comprising a torsion bar connected to the drive shaft.

18. The apparatus of claim 17, further comprising a second shaft centrally connected to the partially open top of the cylinder, and a second torsion bar connected to the second shaft, further comprising bearings connected to the drive shaft and the second shaft.

19. The apparatus of claim 18, wherein the first and second torsion bars have pigtails connected between lower and upper supports and adapted for compensating for shortening or lengthening of the torsion bars upon twisting.

20. The apparatus of claim 11, further comprising a closed bottom on the cylinder, and a partially closed top on the cylinder.

* * * * *